United States Patent
Erke et al.

(10) Patent No.: US 8,737,237 B2
(45) Date of Patent: May 27, 2014

(54) NETWORK FAULT DETECTION METHOD AND APPARATUS

(75) Inventors: Tuomas Erke, Espoo (FI); Keijo Tapio Laiho, Masala (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 239 days.

(21) Appl. No.: 13/496,412

(22) PCT Filed: Sep. 23, 2009

(86) PCT No.: PCT/EP2009/062336
§ 371 (c)(1),
(2), (4) Date: May 22, 2012

(87) PCT Pub. No.: WO2011/035805
PCT Pub. Date: Mar. 31, 2011

(65) Prior Publication Data
US 2012/0224469 A1    Sep. 6, 2012

(51) Int. Cl.
*H04L 12/26* (2006.01)
(52) U.S. Cl.
CPC ................................ *H04L 43/50* (2013.01)
USPC ....................... 370/242; 370/221; 370/241
(58) Field of Classification Search
None
See application file for complete search history.

(56) References Cited

U.S. PATENT DOCUMENTS

| | | | |
|---|---|---|---|
| 4,745,593 A * | 5/1988 | Stewart | 370/244 |
| 7,283,563 B1 | 10/2007 | Allan | |
| 2006/0187819 A1* | 8/2006 | Bryant et al. | 370/216 |
| 2009/0141631 A1* | 6/2009 | Kim et al. | 370/235 |
| 2010/0074119 A1* | 3/2010 | Krishnaswamy | 370/242 |
| 2011/0069620 A1* | 3/2011 | Gintis et al. | 370/250 |

OTHER PUBLICATIONS

Kompella, K., Juniper Networks et al; "Detecting Multi-Protocol Label Switched (MPLS) Data Plane Failures; rfc4379.txt" IETF Standard, Internet Engineering Task Force, IETF, CH, Feb. 1, 2006, pp. 1-50; XP015044811, ISSN: 0000-0003.

* cited by examiner

*Primary Examiner* — Hassan Kizou
*Assistant Examiner* — Tejis Daya
(74) *Attorney, Agent, or Firm* — Coats and Bennett PLLC

(57) ABSTRACT

A method of detecting media plane faults within a communications network. The method comprises, following the establishment of a media plane connection between first and second end point nodes within the network, where the connection transits one or more intermediate nodes within the media plane, sending session test requests from the first end point towards the second end point across a supervision session established over the media plane, and sending session test acknowledgements from the second end point to the first end point, the session test acknowledgements identifying a first border of the supervision session. The method further comprises, in the event of a media plane fault, responding to the sending of a further session test request by returning a further session test acknowledgement identifying a second border of the supervision session. The media plane fault can be detected by comparing the first and second supervision session borders contained in session test acknowledgements.

9 Claims, 5 Drawing Sheets

NETWORK FAULT DETECTION METHOD AND APPARATUS

TECHNICAL FIELD

The present invention relates to a method and apparatus for detecting faults in a network, and in particular to such a method and apparatus that allows network nodes and elements responsible for such faults to be identified.

BACKGROUND

In any telecommunications network, users will from time-to-time suffer poor quality service as a result of faults occurring in the network. For example, a user might experience a silent media plane, where both parties to a call cannot hear one another, or the media plane may be broken in only one direction. The ITU-T has published specifications for fixed systems which include definitions and probabilities for fixed network problems such as unacceptable transmission and interrupt; break (of service). The expected probability for unacceptable transmission is 0.001 percent in fixed networks. Users of cellular networks expect similar or better quality levels compared to fixed network offerings.

Network operators and kit vendors have of course implemented fault detection mechanisms in deployed networks in order to meet or improve upon the ITU-T targets. Examples include:

Using a Continuity Check for TDM and ATM connections to check the integrity of the speech path. This might involve injecting a tone into the speech signal at a first network node and detecting the tone at a second network node or when "reflected" back to the first network node. However, Continuity Check for TDM and ATM connections results in a perceptible degradation of speech and so it is usually performed before a call is actually performed (through-connected). It is not desirable to use Continuity Check to determine media loss during a call. [The Telecommunications Technology Committee, TTC, standard (which is used in Japan for example) does not include a Continuity Check function.] The continuity check is typically using the external connection handling part (Exchange Terminal (ET)) of the node and thus it cannot detect faults in the equipment, which is handling actual media processing such as speech transponders.

RTCP (Real-Time Control Protocol) for IP connections (e.g. Voice over IP, VoIP, calls). As set out for example in 3GPP TS 26.114 V8.3.0, for an RTP based media stream, RTCP packets may be used to deliver reports relating to a connection, between network nodes. Use of RTCP is optional in IP based Nb, Iu, A and Mb interface standards. In a multi-vendor environment, a node cannot know whether or not a peer node (over for example an Nb link between two Media Gateways) has actually activated RTCP or not. Also, RTCP requires extra bandwidth. It is also possible to use STUN (Simple Traversal of UDP through NATs (Network Address Translation)) to deliver reports on an IP connection. STUN is a protocol for assisting devices behind a NAT firewall or router with their packet routing. [RFC 5389 redefines the term STUN as 'Session Traversal Utilities for NAT'.] BFD (Bi-directional Forward Detection) may also be employed for fault detection and reporting purposes, although the mechanism is not on a connection level (but on a node level instead) and so it cannot be used for supervision of connection level problems.

There exist solutions for detecting hanging resources. One such mechanism is the H.248.36 package which allows a Media Gateway Controller to identify hanging connections within a Media Gateway. However, these kind of mechanisms are intended to be run in the background periodically, for example once per hour.

In summary, prior art solutions to fault detection in the media plane suffer from one or more of the problems of user data degradation, increased bandwidth, poor network-wide applicability, and lack of real-time reporting.

SUMMARY

It is an object of the present invention to provide a mechanism for supervising a media plane session and which overcomes or at least mitigates the problems of known methods. This is achieved by sending session test requests across the media plane between end point nodes both before and after a node, link or entity failure, and by comparing the received responses.

According to a first aspect of the present invention there is provided a method of detecting media plane faults within a communications network. The method comprises, following the establishment of a media plane connection between first and second end point nodes within the network, where the connection transits one or more intermediate nodes within the media plane, sending session test requests from the first end point towards the second end point across a supervision session established over the media plane, and sending session test acknowledgements from the second end point to the first end point, the session test acknowledgements identifying a first border of the supervision session. The method further comprises, in the event of a media plane fault, responding to the sending of a further session test request by returning a further session test acknowledgement identifying a second border of the supervision session. The media plane fault can be detected by comparing the first and second supervision session borders contained in session test acknowledgements.

Embodiments of the invention have either no, or only a marginal impact on the quality of user data sent over the supervised media plane. Increases in network traffic are also marginal at worst.

One approach to transporting media plane supervision related information comprises, at each said end point node and the or each intermediate node, detecting silence descriptors within data sent across said media plane connection and injecting session test requests and session test acknowledgements into detected silence descriptors. This may comprise injecting session test requests and session test acknowledgements into user data frames transiting the media plane connection by substituting them for least significant bits of user data blocks.

An alternative approach to transporting media plane supervision related information comprises, at each said end point node and each intermediate node, detecting RTP Control Protocol, RTCP, messages associated with said media plane connection and injecting session test requests and session test acknowledgements into detected RTCP messages as appropriate.

A border of the supervision session may be identified within a session test acknowledgement by an indication of the number of hops involved in the supervision session.

According to an embodiment of the invention, said further session test request may be received by a node immediately preceding a failed node, with that preceding node sending said further session test acknowledgement towards said first end point node.

The method of the above first aspect of the invention may further comprise establishing said supervision session by sending a session request from said first node to a first intermediate node and returning a session acknowledgement from the first intermediate node to said first end point node, and repeating this on a hop-by-hop basis until the second end point has returned a session acknowledgement to the preceding intermediate node. In the event that the first end point fails to receive a session test acknowledgement from the second end point within a defined time window due to failure of a node, the step of setting up a supervision session is repeated until the intermediate node preceding the failed node has returned a session acknowledgement to the preceding intermediate node. A session test request is sent from the first end point to the intermediate node preceding the failed node across the supervision session, whereupon that intermediate node responds by performing said step of sending said session test acknowledgement containing an indication of the number of hops between the first end point node and the failed node.

The method may comprise establishing a further supervision session in the reverse direction and causing session test requests to be sent from the second end point to the first endpoint across the further supervision session and session test acknowledgements to be sent in the opposite direction, and in the event that the second end point fails to receive a session test acknowledgement within a defined time window, seeking to re-establish the further supervision session.

The method may comprise conducting a negotiation over the call control plane between said end point and intermediate nodes in order to agree on a format for said session test request and session test acknowledgement.

According to a second aspect of the present invention there is provided apparatus for handling media plane traffic within a communications network. The apparatus comprises a connection establishment unit for establishing a media plane connection between the apparatus, acting as a first media plane end point within the network, and a second media plane end point. A media plane supervisor is provided for sending session test requests to said second endpoint across a supervision session established over said media plane, and for receiving session test acknowledgements from the second end point, the session test acknowledgements identifying a first border of the supervision session. A fault handler is responsive to a failure to receive a session test acknowledgement from the second end point due to a media plane fault, to cause said media plane supervisor to send a session test request and to receive a session test acknowledgement, the session acknowledgement identifying a second border of the supervision session. The media plane fault can be detected by comparing the first and second supervision session borders contained in session test acknowledgements returned to the first end point node.

The media plane supervisor may be configured to identify a hop count within a received session test acknowledgement, this hop count being indicative of the border of the supervision session.

According to a third aspect of the present invention there is provided apparatus for handling media plane traffic within a communications network and comprising a connection establishment unit for establishing a media plane connection between the apparatus and a first media plane end point. There is also provided a media plane supervisor for receiving a session test request from said first end point across a supervision session established over said media plane, and comprising a response unit configured to send a session test acknowledgement to the first end point, the session test acknowledgement identifying the apparatus as a border of the supervision session.

According to a fourth aspect of the present invention there is provided apparatus for handling media plane traffic within a communications network and comprising a connection establishment unit for establishing a media plane connection between a first media plane end point and a second media plane end point. There is also provided a media plane supervisor for receiving a session test request from said first end point across a supervision session established over said media plane, and comprising a relaying unit configured to relay the session test request to a further intermediate node or to said second end point, to receive in response a session test acknowledgement identifying a subsequent node as a border of the supervision session, and to relay the session test acknowledgement towards the first end point.

The apparatus of the fourth aspect of the present invention may comprise a response unit configured to send a session test acknowledgement to the first end point, the session test acknowledgement identifying the apparatus as a border of the supervision session. This unit is activated in the case of an "upstream" fault, in which case the apparatus becomes the new session border node.

The apparatus of the second to fourth aspects of the invention may be to implement a method according to the first aspect of the invention.

According to a fifth aspect of the present invention there is provided a method of detecting media plane faults within a communications network, the method comprising:

following the establishment of a media plane connection between first and second end point nodes within the network, where the connection transits a plurality of intermediate nodes within the media plane, 1) setting up a first supervision session by sending a session request from said first node to a first intermediate node and returning a session acknowledgement from the first intermediate node to said first end point node, and repeating this on a hop-by-hop basis until the second end point has returned a session acknowledgement to the preceding intermediate node, 2) sending session test requests from the first end point to the second endpoint across the supervision session, and sending session test acknowledgements from the second end point to the first end point, the session test acknowledgements containing an indication of the number of hops involved in the session;

3) in the event that the first end point fails to receive a session test acknowledgement from the second end point within a defined time window due to failure of a node or link, repeating step 1) until the intermediate node preceding the failed node or link has returned a session acknowledgement to the preceding intermediate node, 4) sending a session test request from the first end point to the intermediate node preceding the failed node across the second supervision session, and sending a session test acknowledgement from that intermediate node to the first end point, the session test acknowledgement containing an indication of the number of hops involved in the second supervision session, wherein the identity of the failed node can be determined by comparing the hop count contained in the session update acknowledgement(s) of step 2) with that contained in the session update acknowledgement of step 4).

According to a sixth aspect of the present invention there is provided apparatus for handling media plane traffic within a communications network and comprising:

- a connection establishment unit for establishing a media plane connection between the apparatus, acting as a first media plane end point within the network, and a second media plane end point;
- a supervisory session establishment unit for setting up a first supervision session with said second end point by sending a session request to a first intermediate node and receiving in response a session acknowledgement;
- a media plane supervisor for sending session test requests to said second endpoint across the supervision session, and for receiving session test acknowledgements from the second end point, the session test acknowledgements containing an indication of the number of hops involved in the session;
- a fault handler, responsive to a failure to receive a session test acknowledgement from the second end point within a defined time window due to failure of a node,
    - to cause said supervisory session establishment unit to send a session request to a first intermediate node and receive in response a session acknowledgement in order to set up a second supervision session with an intermediate node preceding the failed node, and
    - to cause said media plane supervisor to send a session test request to the intermediate node preceding the failed node across the second supervision session, and to receive a session test acknowledgement from that intermediate node, the session acknowledgement containing an indication of the number of hops involved in the second supervision session,
- wherein the identity of the failed node can be determined by comparing the hop count contained in the session test acknowledgement(s) received from the second end point with that contained in the session test acknowledgement received from the node preceding the failed node.

DETAILED DESCRIPTION

A mechanism is proposed here which allows a fault within a network to be identified and possibly isolated to a particular network node (or functional entity within a node). Moreover, the mechanism is real-time in the sense that it can report and isolate a fault associated with a call, whilst the call is ongoing. It is assumed for the purposes of illustration that a dedicated network server is provided for controlling the collection of fault reports, and for making these reports available to the network operator. Such a server may be connected to various appropriate network nodes via normal operational and maintenance interfaces (e.g. SNMP, CORBA, NETCONF) The server may act upon fault reports, for example by reconfiguring network paths to avoid faulty nodes/elements.

Implementation of the fault monitoring mechanisms may involve a negotiation between the participating network nodes in order to avoid uncertainty, e.g. when a node does not respond due to its not supporting a mechanism). This can be achieved via user plane negotiation or control plane negotiation. In the latter case, the mechanism should be specified in updated H.248, RANAP, BICC, ISUP protocols, or SDP/SIP protocols.

Figure 1:
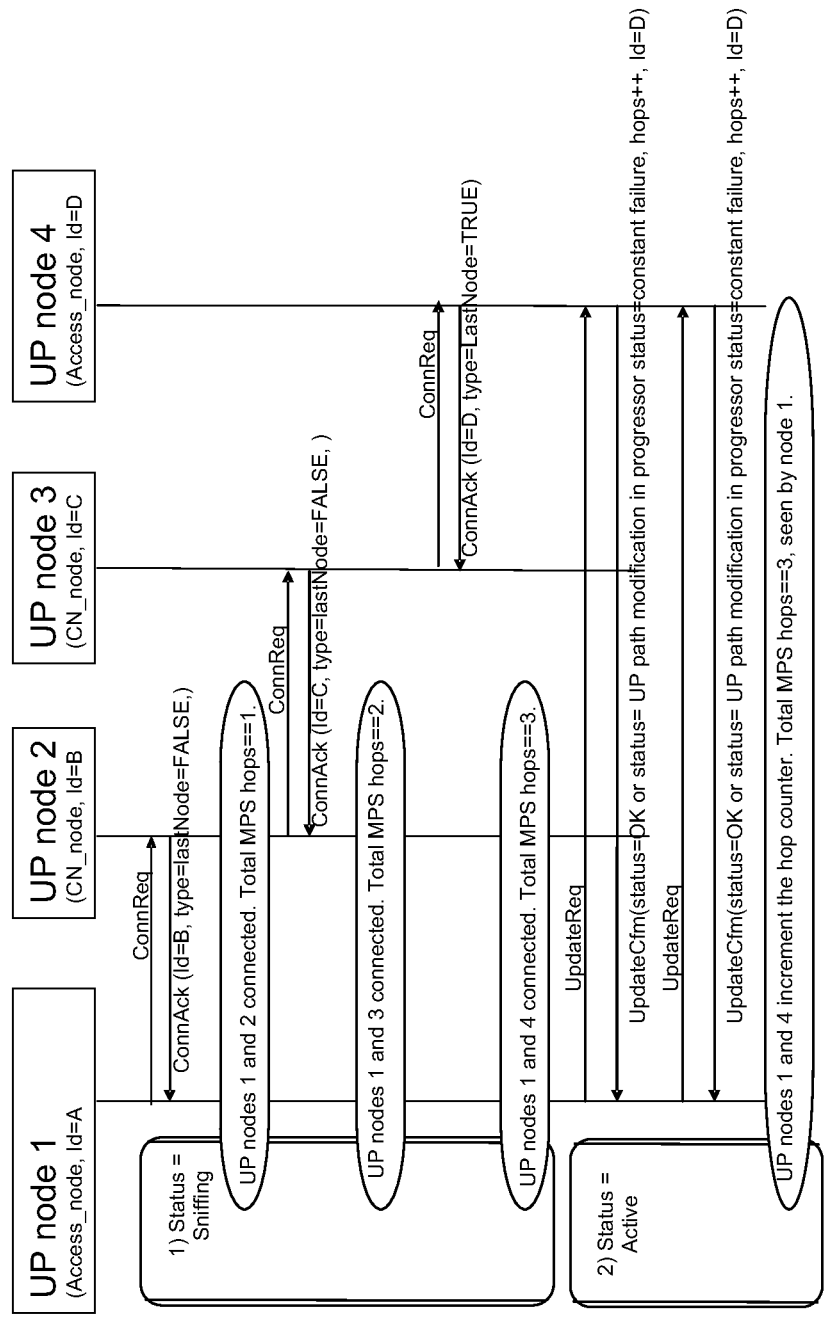
FIG. 1 illustrates a procedure for establishing a media plane supervision session spanning multiple network nodes.

FIG. 1 illustrates a procedure for setting up a media plane or user plane (UP) fault detection scheme within a network comprising two access nodes (UP node 1 and UP node 4). The links between the nodes may be IP, TDM or ATM links. In the following example however, a network involving IP links is considered, with the user plane transporting Adaptive Multi-rate Compression (AMR) speech data. Senders and receivers of speech data employ AMR speech compression/decompression according to which periods of silence are represented by the insertion of a Silence Insertion Descriptor (SID) into the AMR coded speech data in order to increase the compression ratio and reduce consumed bandwidth.

The access nodes could be, for example, Radio Network Controllers (RNCs) of a UMTS Terrestrial Radio Access Network (UTRAN) circuit switched domain, Access Border Gateway Functions (A-BGFs) of a packet switched/IMS domain, or Media Gateways (MGws) in the case of interworking to a circuit switched domain. As well as traversing the two access nodes, a given call connection between two user terminals traverses a pair of media processing nodes, e.g. MGws, BGF, or MRFP, namely UP node 2 and UP node 3. The call between the user terminals is established in the usual way, and the associated steps involving the network nodes are not shown in the Figure. Once established, UP node 1 determines that the fault detection scheme should be applied to the call in the direction from UP node 1 to UP node 2. The actual mechanism whereby a node determines that MPS should be applied is not considered here in detail. However, this may be instructed by some central fault supervision server, or a node may determine this for itself. In addition, detailed consideration is not given to the manner in which peer nodes negotiate MPS capability, although this is likely to involve some modification or extension to one or more existing inter-node protocols, for example BICC, ISUP, SDP/SIP, RANAP, H.248.

In the case of the Nb interface (3GPP TS29.415) between peer Media Gateways, user plane negotiation is updated with an indication as to whether or not a peer party supports MPS or not. This could either be a new parameter or a new user plane version for the Nb interface (between peer Media Gateways). In the case of the RTCP-based solution, the RTCP_APP would have to be applied with new RTCP_APP values for MPS.

In the case of the Iu interface (3GPP TS25.415) between RNC and Media Gateway, the user plane negotiation mechanism is updated with an indication as to whether or not the peer party supports MPS or not. This could either be a new parameter or a new user plane version for the Iu interface.

During a first phase of the procedure, UP node 1 and UP node 4 determine that they are end point or border nodes from the Media Plane Supervision (MPS) support point of view. Thus they are the end nodes when MPS is in active state. UP node 1 may determine that it is an endpoint node by determining that no ConnReq flag has been received from a previous node despite establishment of a user plane connection. UP nodes 2 and 3 are intermediate nodes from the MPS support point of view and thus they go to transparent mode for MPS. UP node 1 "sniffs" media plane data to identify SID frames. Once identified, UP node 1 injects into a SID frame a ConnReq flag, and the SID frame is relayed to UP node 2. The supervision process running at UP node 2 detects the modified SID frame with injected flag, and forwards it to UP node 3. At the same time, UP node 2 identifies the next SID frame travelling in the opposite direction, and injects into that a ConnAck flag, as well as its own node identity and a further flag indicating that UP node 2 is not the last node in the call. UP node 3 reacts similarly to UP node 2 when it receives the modified SID frame from UP node 2. When UP node 4 receives the SID frame with ConnReq flag, it responds to UP node 3, this time setting a flag to indicate that it is the last node in the call. UP node 4 may attempt to send a ConnReq flag to a subsequent node in the session, and in this case it will determine from the lack of a response that it is an end point node.

Following receipt of the modified SID frame from UP node 2 with ConnAck flag set, the media plane supervision session is considered established and UP node 1 enters an active, fault detection phase, during which it periodically adds to SID frames transiting through it, an UpdateReq flag. This modified SID frame represents a "session test request". SID frames with this flag set are passed transparently through the intermediate nodes UP node 2 and UP node 3, and are received unaltered by end node UP node 4. As UP node 4 is an end node, it responds to the UpdateReq notification by adding, to the next SID frame travelling in the opposite direction, an UpdateCfm flag, together with an indication of the media plane status, a hop counter, and its own node identity. This modified SID frame represents a "session test acknowledgement" and indicates in general terms the supervision session border. Again, SID frames containing the UpdateCfm flag pass though the intermediate nodes which update the hop counter, and are received by UP node 1. Assuming that UP node 1 receives a message containing the UpdateCfm flag before a timer, initiated upon sending of the SID frame containing the UpdateReq flag, has expired, UP node 1 records that the connection status is OK. UP node 1 can also determine from the hop counter that accompanies the UpdateCfm flag the total number of hops to the peer end node, in this case "3". UpdateReq flags are added at regular intervals to SID frames transiting UP node 1 in order to provide near real-time reports on the fault status of the connection.

It is noted that a node, e.g. UP node 4, may include a flag into the UpdateCfm to indicate a media plane connection status. For example, if UP node 4 is a Radio Network Controller (RNC) it will know when the peer user is involved in a handover (between NodeBs of the UTRAN), and can include a "temporary break" flag. This may avoid UP node 1 attempting to re-establish the supervision session. It may also avoid UP node 1 reacting to a change in the hop count.

Considering further injection of MPS notifications into SID data, a node may remove, i.e. set to zero, the SID frame quality indicator, meaning that the frame is SID-BAD. A node terminal or other node receiving such a frame will ignore the frame data and typically make use of the last received SID frame instead. The actual flag (ConnReq, ConnCfm, etc) may be inserted into the frame so as to replace pre-existing "comfort noise" data, e.g., the "Class A bits". As an alternative to injecting MPS notifications into SID frames, the notifications may be appended to them. New SID frame sizes could be negotiated between nodes using new RFCI (RAB sub Flow Combination Identifier) values and possibly using new message types for MPS.

Figure 2:
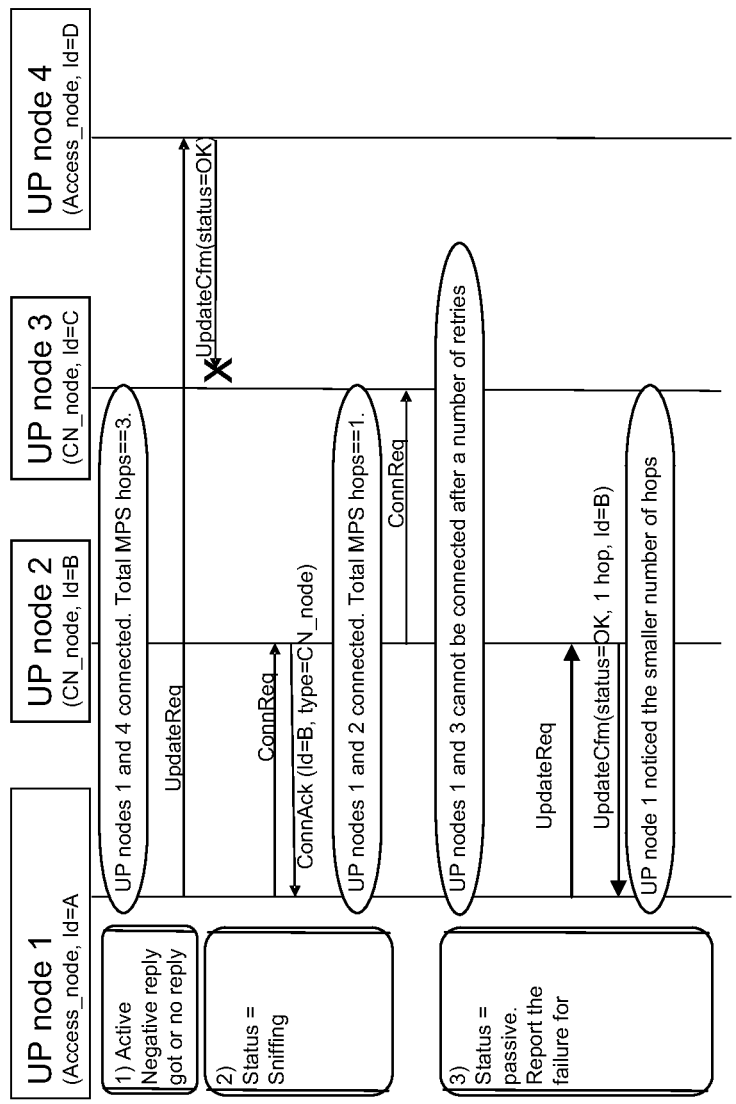
FIG. 2 illustrates a procedure for detecting and potentially isolating a fault within a network.

FIG. 2 illustrates a procedure for handling a fault which subsequently occurs at UP node 3, in the media plane direction from UP node 4 to UP node 3 (with the assumption that the media plane in the direction from UP node 1 to UP node 4 functions correctly). A periodic UpdateReq notification is received at UP node 4, and this node responds by returning an UpdateCfm with fault status OK in the direction of UP node 1. However, as there is a fault in the media plane at UP node 3, the SID frame containing the notification is not relayed to UP node 2 and hence to UP node 1. The timer associated with the UpdateReq notification expires at UP node 1 before any response is received. UP node 1 reacts to expiry of the timer by re-entering the sniffing state, e.g. it adds a ConnReq flag to the next SID frame towards UP node 4. As UP node 2 is functioning properly, it returns a ConnAck notification to UP node 1, whilst forwarding the ConnAck to UP node 3. As UP node 3 has failed, it cannot return a ConnAck notification to UP node 2. UP node 2 may resend the ConnAck to UP node 3 some predefined number of times before giving up.

Following the receipt of the ConnAck notification from UP node 2 by UP node 1, UP node 1 sends out a first UpdateReq notification. This is received by UP node 2, but as that node is aware that UP node 3 has failed, it returns an UpdateCfm notification to UP node 1 including a hop count and the ID of UP node 2. The hop count value in this case is "1". When UP node 1 receives the notification, it can determine from the hop counter, or in more general terms from a different indication of a supervision session border, that a failure has occurred. It can also determine from the identity contained in the response that the failure has occurred in the link or node after UP node 2. The hop count value may be used in order to handle the case where a node appears multiple times in the same media plane session.

The end point node initiating the supervision session may maintain fault counters to record network performance for each transport type, e.g. a counter recording the number of successful, normal terminations without media plane loss cases for this transport type. Of course, for each failure event recorded by a counter, the location of the failure may also be recorded. Counter values are reported to the Media Gateway Controller in a new H.248 package. In the case of a RNC as media plane node, the RANAP protocol may be used to provide fault reports to a monitoring function.

It will be appreciated that the steps of re-establishing the media plane supervision session to the new border node, and of sending out a session test request and receiving a session test response, should be performed relatively quickly in order to allow the process to complete before one of the users terminates the media plane session. It will typically take at least a few seconds however before this happens.

Figure 4:
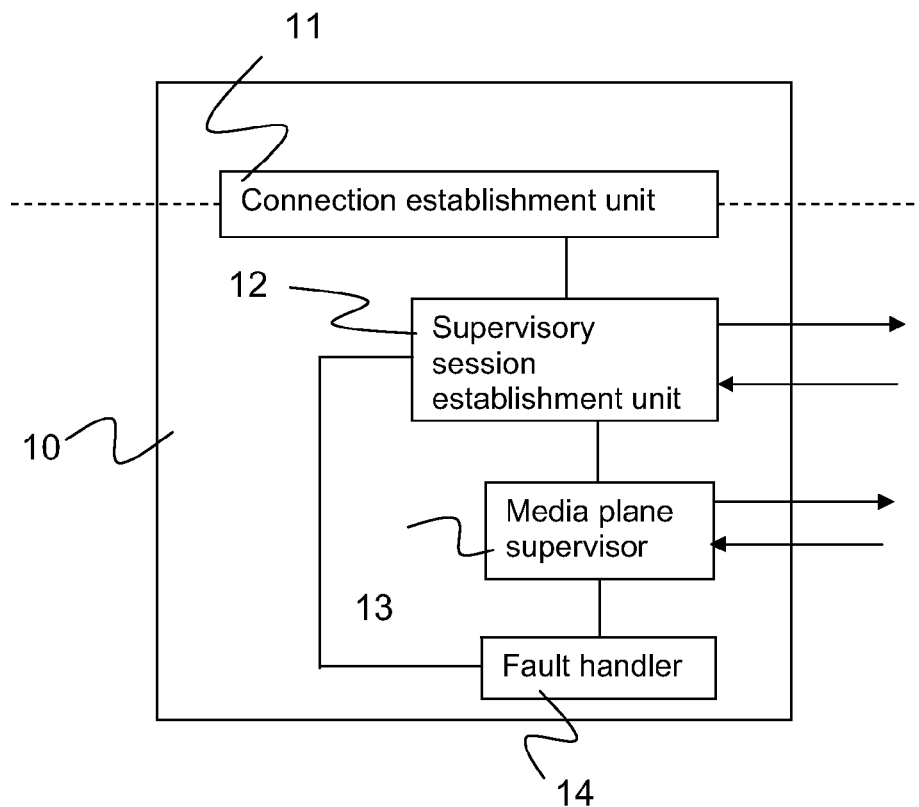
FIG. 4 illustrates schematically a media plane network node acting as initiating node and including components for monitoring the media plane.

FIG. 4 illustrates schematically a network end point node 10, which may be, for example, a Media Gateway, MGw, or a Radio Network Controller (RNC). The end point node 10 comprises a conventional connection establishment unit 11 for establishing a media plane connection with a peer end point node, i.e. a peer MGw or RNC. The end point node 10 cooperates with a controller (not shown), e.g. a Media Gateway Controller in the case of a MGw, which lies in the call control plane, using a Media Gateway Control Protocol. The end point node further comprises a supervisory session establishment unit 12 which is responsible for sending a session request to the first hop intermediate node in the media plane and for receiving a session response. A media plane supervisor 13 is responsible for periodically sending out session test requests towards the peer end point end point node, and for receiving session test acknowledgements. The media plane supervisor 13 identifies a hop count contained within these acknowledgements, and stores at least the most recent. A fault handler 14 reacts to failure of the media plane supervisor to receive a session test acknowledgement by instructing the supervisory session establishment unit 12 to re-establish the supervisory session as described above. The media plane supervisor 13 then sends a further session test request and receives an acknowledgement from the new border node in the session, i.e. the node preceding a failed node. By comparing the hop count contained in the acknowledgement with that stored for the most recently receive acknowledgement before failure occurred, a fault can be detected and isolated.

Figure 5:
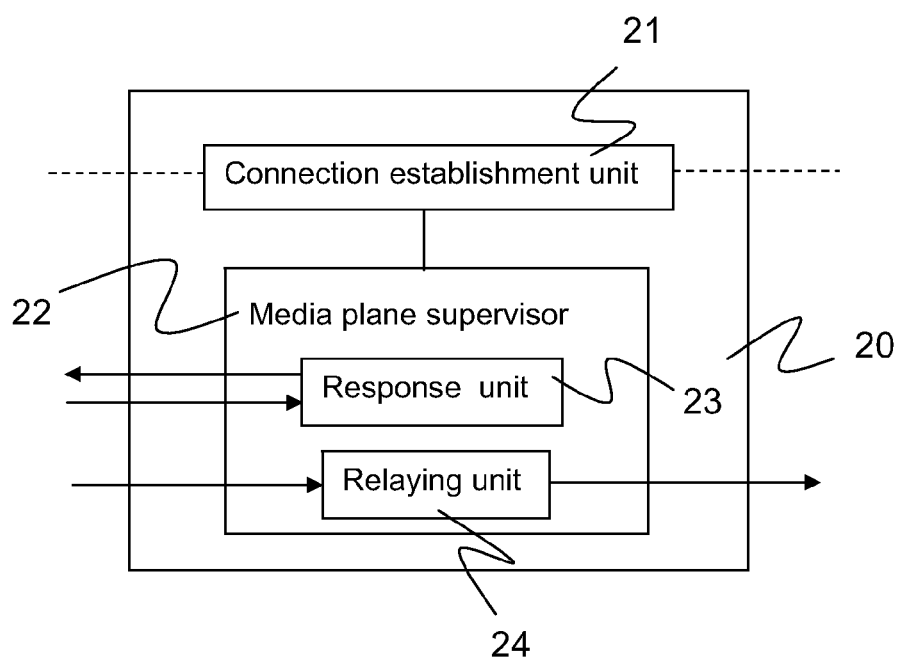
FIG. 5 illustrates schematically a media plane network node acting as intermediate or terminating side node and including components for monitoring the media plane.

FIG. 5 illustrates schematically components of a network node 20, e.g. a MGw or RNC, acting as either an intermediate node or a terminating (from the point of view of the supervision session) end point. The node 20 comprises a media plane connection establishment unit 21 for assisting with the establishment of a media plane across the network. A media plane supervisor 22 is responsible for detecting the media plane connection and for determining whether the node is an intermediate node or an end point node. The supervisor 22 exchanges session request and session acknowledgement messages with a neighbouring node or nodes to establish the media plane supervision session. If the node is an end point node, it configures a response unit 23 which receives session test requests from a preceding node, and responds with session test acknowledgements containing a hop count. If the node is an intermediate node, the node configures a relaying unit 24. The relaying unit receives session test requests from a preceding node, and relays these on to the next hop node. The relaying unit receives session test acknowledgements from the next hop node (assuming no faults have occurred), and relays these to the preceding node.

Figure 6:
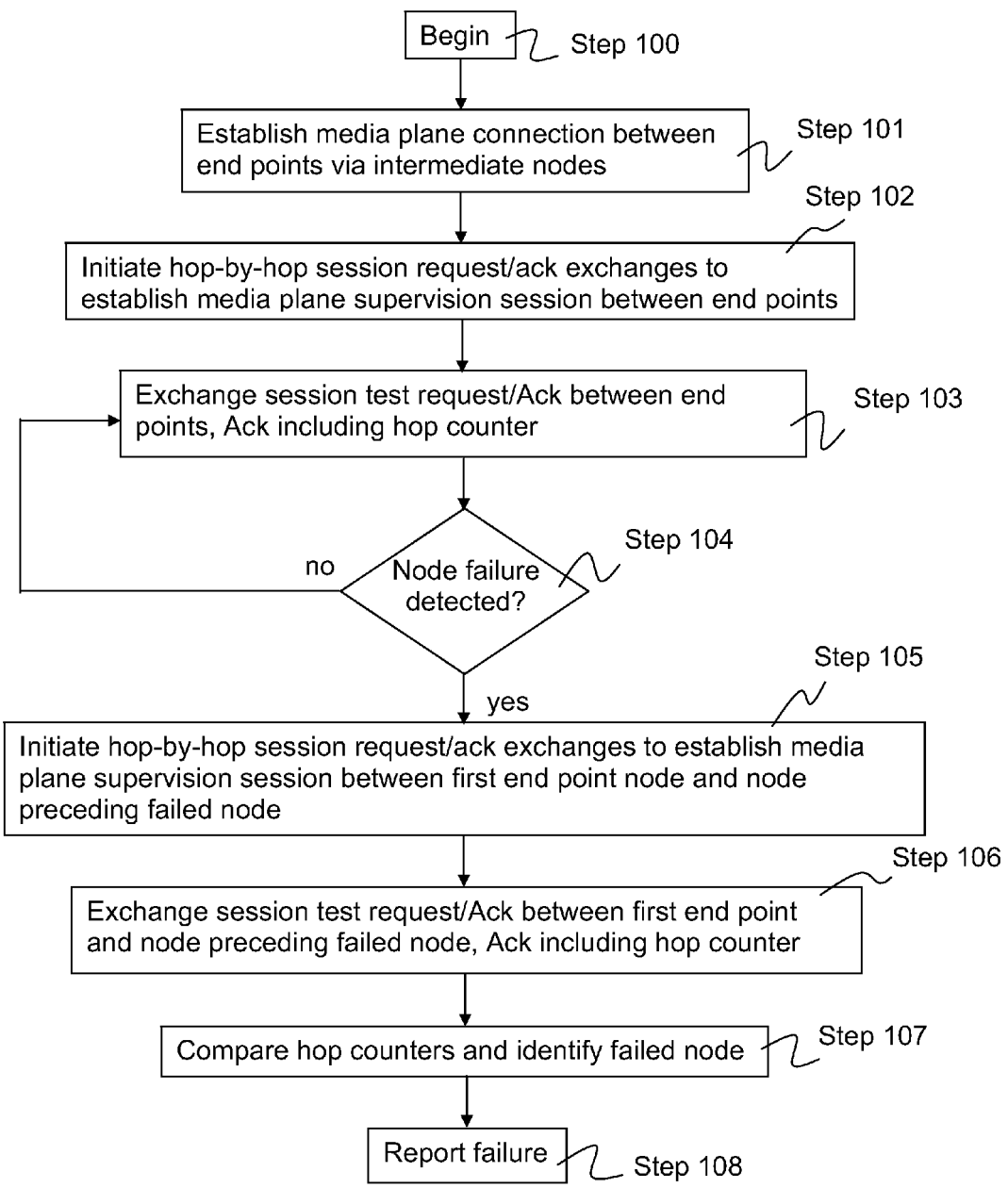
FIG. 6 is a flow diagram illustrating a procedure for establishing a media plane supervision session and for monitoring faults using the session.

FIG. 6 is a flow diagram illustrating the main steps in the fault monitoring and detection procedure described above. The procedure begins at step 100, with a media plane connection being established at step 101. The step may be a response to receipt of a connection establishment request received at a MGw from a MGC which is in turn responding to an end user originating connection establishment request. The originating side end point node send at step 102 a supervisory session request to the first hop intermediate node in the media plane and receives back a session acknowledgement. This in turn triggers the hop by hop establishment of the supervisory session all the way to the peer end point node.

At step 103, the originating side end point node then enters a monitoring state, periodically sending out session test requests towards the peer end point node and receiving in response session test acknowledgements, each of which contains a hop count. In the event that an acknowledgement is not received within a set window, a failure is detected at step 104. In this case, at step 105, the originating side end point node attempts to re-establish the supervisory session, by sending out the session request and receiving back from the first hop intermediate node (assuming that that intermediate node has not failed) a session acknowledgement. The supervisory session is thus re-established, but only as far as the node preceding a failed node or link. At step 106, the originating side end point node sends out a session test request, and will receive a session test acknowledgement back from the new end point node. This contains a new hop count value. By comparing this new hop count with a previous value, a fault can be detected at step 107. The failure is reported at step 108.

The approach described above has the advantage that no audible degradation to the speech connection arises as a result of the MPS procedure. This can be contrasted with the degradation that arises from certain prior art mechanisms, e.g. using Continuity Check. A reduced signalling load may also be achieved as compared with prior art mechanisms.

Figure 3:
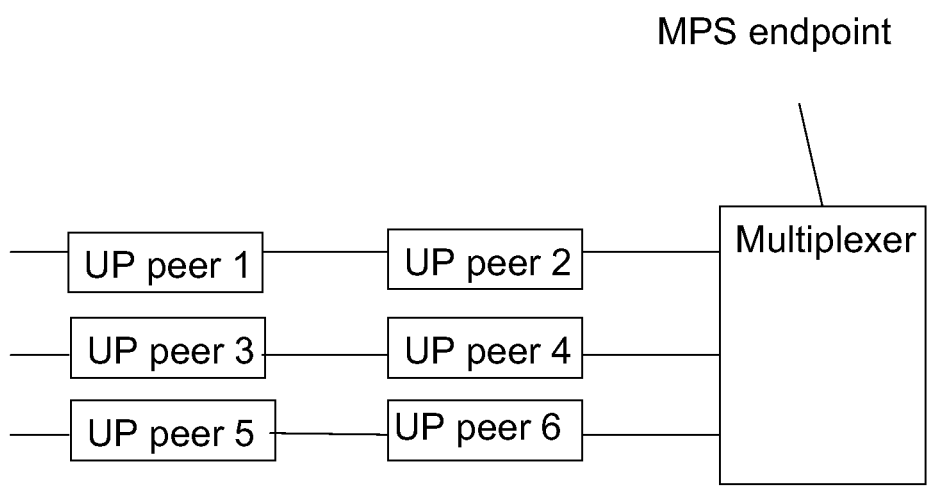
FIG. 3 illustrates a conference call scenario involving multiple network nodes.

In the case of a conference call, a node acting as a multiplexer (i.e. a conference bridge) for the various participants may operate as an end point from the point of view of the MPS process. The multiplexer is then able to determine and isolate a network fault associated with the conference call. This is illustrated schematically in FIG. 3, where UP peers 1, 3 and 5 represent end point nodes with the multiplexer representing the other end point node, and UP peers 2, 4 and 6 representing intermediate nodes.

The approach described above piggybacks MPS related notifications onto silence descriptor frames resulting from the application of speech codecs (e.g. AMR) at user terminals. In the case of an IP link, where a codec is used which does not introduce silence frames, an alternative approach makes use of the Real-time Transport Protocol Control Protocol (RTCP). RTCP is specified in IETF RFC 3550 and aims to provide out-of-band statistics and control information for an associated Real-time Transport Protocol (RTP) flow. In particular, RTCP_APP packages (see 3GPP TS26.114) are used in order to build a Media Plane Supervision (MPS) protocol.

Another approach, applicable in the case of TDM, ATM and IP links when speech is encoded using a codec that does not silence frames (e.g. PCM), involves "stealing" a small number of the least significant bits of speech data at the media plane end point nodes. The stolen bits are replaced with the MPS flags considered above.

The approaches described above may also be used to monitor problems within certain network node, for example, a faulty caused by a particular ET can be identified using this mechanism. The basic idea is that the mechanism works as close to actual speech path as possible, such that any fault in the speech path is detected as a fault in the supervision path.

It will be appreciated by the person of skill in the art that various modifications may be made to the above described embodiments without departing from the scope of the present invention. For example, whilst the approach described above makes use of a hop count within the session test acknowledgement to assist in identifying the (current) border of the media plane supervision session, other means may be used to identify this border. For example, an end point node may include a session identifier into the session test acknowledgement. In a further modification, the initial supervision session setup exchange may be avoided. In this case, the first session test request (UpdateReq) acts as the session request with the first session test acknowledgement (UpdateCfm) acting as the session acknowledgement. The skilled person will appreciate that the MPS approach described above may be used over the Mb interface within the IMS, and also when interconnecting with the IMS.

The following is a list of abbreviations used above:
ATM Asynchronous Transfer Mode
BFD Bi-Directional Forward Detection
BICC Bearer Independent Call Control
BSC Base Station Controller
CSD Circuit-Switched Data
GCP Gateway Control Protocol
IMS IP Multimedia Subsystem
IP Internet Protocol
ISDN Integrated Services Digital Network
MGw Media Gateway
MPS Media Plane Supervision
PSTN Public Switched Telephone Network
RANAP Radio Access Network Application Part
RNC Radio Network Controller
RTCP Real-Time Control Protocol TDM Time Division Multiplexing
VAD Voice Activity Detector

The invention claimed is:

1. A method of detecting media plane faults within a communications network, the method comprising:
after establishment of a media plane connection between first and second end point nodes within the network, where the connection transits one or more intermediate nodes within the media plane:
sending session test requests from the first end point node toward the second end point node across a supervision session established over the media plane;
sending session test acknowledgements from the second end point node to the first end point node, the session test acknowledgements identifying a first border of the supervision session;
in response to a media plane fault, responding to the sending of a further session test request by returning a further session test acknowledgement identifying a second border of the supervision session;
detecting a media plane fault by comparing the first and second supervision session borders contained in session test acknowledgements.

2. The method of claim 1 further comprising, at the first and second end point nodes and at the one or more intermediate nodes, detecting silence descriptors within data sent across the media plane connection and injecting session test requests and session test acknowledgements into detected silence descriptors.

3. The method of claim 1 further comprising at least one of:
injecting session test requests into user data frames transiting the media plane connection by substituting the session test requests for least significant bits of user data blocks;
injecting session test acknowledgements into user data frames transiting the media plane connection by substituting the session test acknowledgements for least significant bits of user data blocks.

4. The method of claim 1 further comprising, at the first and second end point nodes and at the one or more intermediate nodes, detecting RTP Control Protocol (RTCP) messages associated with the media plane connection and injecting session test requests and session test acknowledgements into detected RTCP messages.

5. The method of claim 1 wherein a border of the supervision session is identified within a session test acknowledgement by an indication of the number of hops involved in the supervision session.

6. The method of claim 1:
further comprising receiving the further session test request by a node immediately preceding a failed node; and
in response thereto, that preceding node sending the further session test acknowledgement towards the first end point node.

7. The method of claim 1:
further comprising establishing the supervision session by sending a session request from the first node to a first intermediate node and returning a session acknowledgement from the first intermediate node to the first end point node, and repeating this on a hop-by-hop basis until the second end point node has returned a session acknowledgement to the preceding intermediate node;
in response to the first end point node failing to receive a session test acknowledgement from the second end point node within a predefined time window due to failure of a node, establishing another supervision session on a hop-by-hop basis, starting from the first end point node, until the intermediate node preceding the failed node has returned a session acknowledgement to the preceding intermediate node;
thereafter, sending a session test request from the first end point node to the intermediate node preceding the failed node across the supervision session, whereupon that intermediate node responds by performing the step of sending the session test acknowledgement containing an indication of the number of hops between the first end point node and the failed node.

8. The method of to claim 1:
further comprising establishing a further supervision session in the reverse direction and causing session test requests to be sent from the second end point node to the first end point node across the further supervision session and session test acknowledgements to be sent in the opposite direction;
in response to the second end point node fails to receive a session test acknowledgement in the further supervision session within a defined time window, seeking to re-establish the further supervision session.

9. The method of claim 1 further comprising conducting a negotiation over the call control plane between at least one of the first and second end point nodes and at least one intermediate node in order to agree on a format for the session test request and session test acknowledgement.

* * * * *